United States Patent

[11] 3,600,507

[72] Inventors Peter M. Newgard
Redwood City;
Alfred E. Brain, El Granada, both of, Calif.
[21] Appl. No. 832,113
[22] Filed June 11, 1969
[45] Patented Aug. 17, 1971
[73] Assignee The United States of America as represented by the Secretary of the Air Force

[54] HIGH DATA RATE OPTICAL COMMUNICATION SYSTEM
3 Claims, 8 Drawing Figs.

[52] U.S. Cl. .......... 178/6, 178/6.7, 178/DIG. 27, 178/7.6, 355/49
[51] Int. Cl. .......... H04n 1/06
[50] Field of Search .......... 95/11 HC; 355/49, 51, 57, 60; 178/7.1, 7.6, 6.6, 6.7, 6, DIG. 27; 235/61.11; 250/199, 219 DC

[56] References Cited
UNITED STATES PATENTS

| | | | |
|---|---|---|---|
| 1,809,617 | 6/1931 | Wright | 178/7.1 E |
| 1,857,130 | 5/1932 | Alexanderson | 178/7.1 |
| 2,209,719 | 7/1940 | Rustad | 178/7.1 |
| 2,894,065 | 7/1959 | Wise | 178/7.1 |
| 3,396,266 | 8/1968 | Max | 235/61.11 |
| 2,044,831 | 6/1936 | Chereau | 178/6.7 |

*Primary Examiner*—Robert L. Griffin
*Assistant Examiner*—Joseph A. Orsino, Jr.
*Attorneys*—Harry A. Herbert, Jr. and Robert K. Duncan

ABSTRACT: A high data rate optical communication system in which a high speed mechanical scanner directs a converging laser light beam through an intelligence containing film which is reflected back through the film by a mirror surface positioned on the immediate exterior of the film. The beam is modulated by twice passing it through the film and is directed back to the scanner for transmission to a receiver where the transmitted beam will recreate the transmitted information on an unexposed film at the receiver.

INVENTORS
PETER M. NEWGARD
ALFRED E. BRAIN
BY Harry A. Herbert Jr
ATTORNEY

PATENTED AUG 17 1971

3,600,507

INVENTORS
PETER M. NEWGARD
ALFRED E. BRAIN
BY Harry A. Herbert Jr
ATTORNEY

INVENTORS
PETER M. NEWGARD
ALFRED E. BRAIN
BY Harry A. Herbert Jr
ATTORNEY

HIGH DATA RATE OPTICAL COMMUNICATION SYSTEM

BACKGROUND OF THE INVENTION

This invention relates to a direct optical transmission system in which a modulated laser light beam is utilized as the carrier.

Communications systems utilizing light as the carrier have been implemented in which a modulating medium, such as a film of varying density, modulates a light beam. Such a system is described in U.S. Pat. No. 3,396,266 issued to Max. One disadvantage of the prior art is that the modulated light beam is directed to a light sensitive device for demodulation i.e., the light sensitive device generates an electrical output representative of the transmitted information. The prior art also does not disclose a high speed scanner for use in directing a light beam towards a modulating or demodulating medium.

The subject invention provides a system for directly modulating and demodulating a light beam, and also provides a high speed scanner for increasing the rate at which information may be transmitted via a light beam.

SUMMARY OF THE INVENTION

The invention encompasses a transmitter and a receiver for the transmission and reception of a modulated laser light beam. Both the transmitter and receiver make use of the exit-beam deflection concept, in which a converging beam is deflected by a rotating mirror to traverse the inside of a cylindrical film support drum. A narrow circumferential slit in the cylinder allows the beam to pass through to a film wrapped in a helix around the exterior surface of the film support drum; the beam comes to a focus at the exterior surface of the film.

In the transmitter, a flexible mirror tape is held against the outside surface of an exposed film. Light passing through the exposed film in the transmitter is focused on the mirror surface and is reflected back through the film and passed through a collimating lens for transmission to the receiver.

The receiver unit, identical to the transmitter directs the modulated light beam to pass through an unexposed film, thus exposing the film in accordance with the intensity of the transmitted beam.

DESCRIPTION OF THE PREFERRED EMBODIMENT

Figure 1:
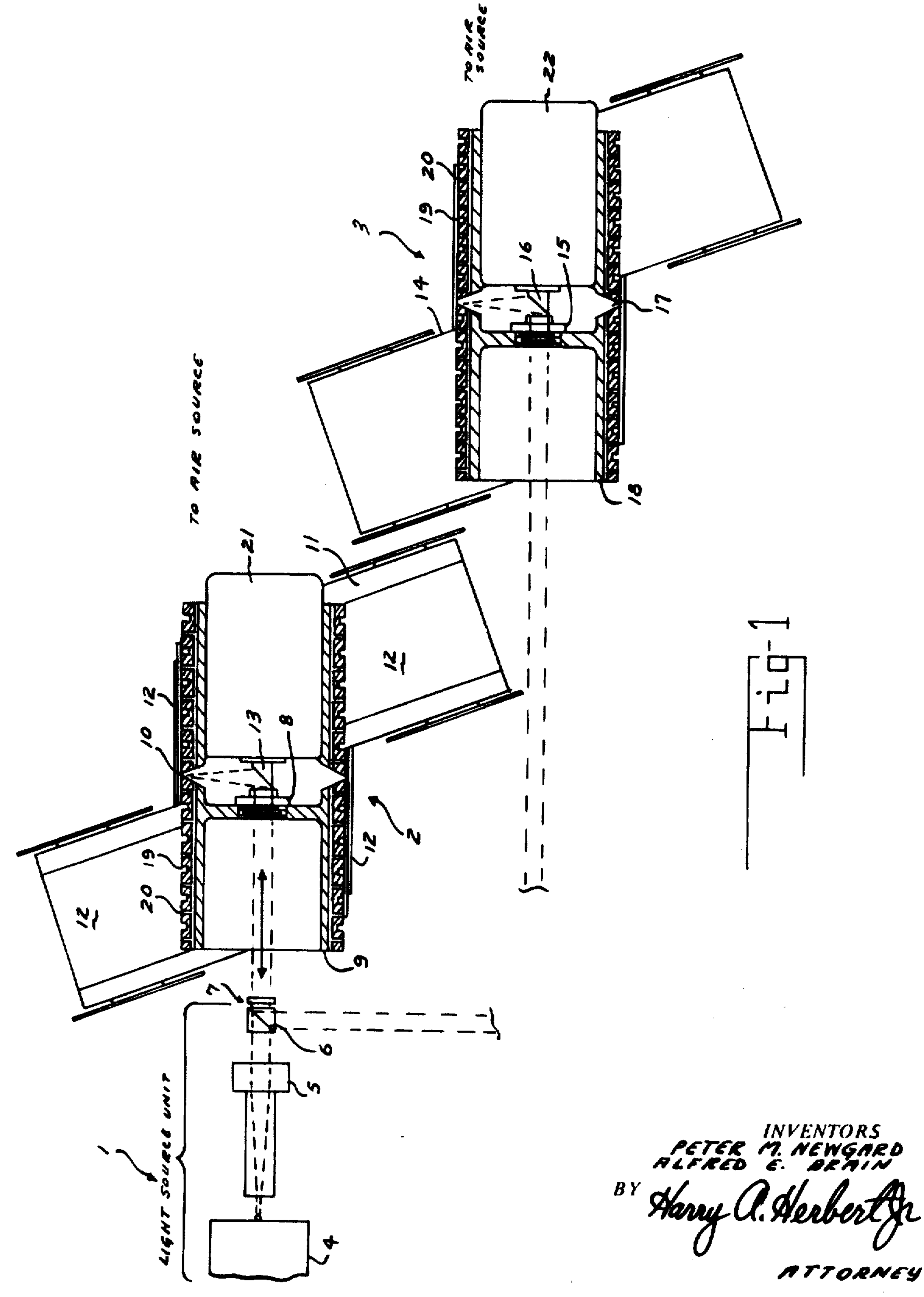
FIG. 1 is a schematic diagram of the communication system embodying the invention.

Turning first to FIG. 1, a light source unit 1, transmitter 2 and receiver 3 comprise the optical communications system embodying the invention.

The light source for producing a high intensity collimated incident light beam includes He–Ne continuous wave laser 4 operating at 6,328 A., a beam expander 5, a beam splitter 6 and a quarter wave plate 7. Laser light is used because of its monochromatic characteristic which effectively eliminates chromatic aberration as a source of optical error. In addition, laser light is polarized, which characteristic is used to facilitate beam separation with a polarized beam splitter for reasons soon to become apparent. The light beam splitter for reasons soon to become apparent. The light beam passes through the beam expander 5, which provides a reasonable uniform light intensity at focusing lens 8 located in the transmitter 2. After exiting the beam expander, the beam passes through a beam splitter and a quarter wave retardation plate. The beam splitter 6 contains a polarized element which passes about 90 percent of correctly orientated light on towards the objective focusing lens 8 which performs the dual function of focusing a collimated light beam on the film and also collimates the light reflected from the mirror tape.

Figure 2:
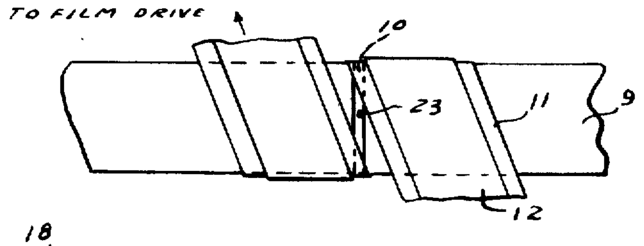
FIG. 2 is a top plan view of the transmitter cylindrical support looking down at the gap formed between the film edges.
Figure 4:
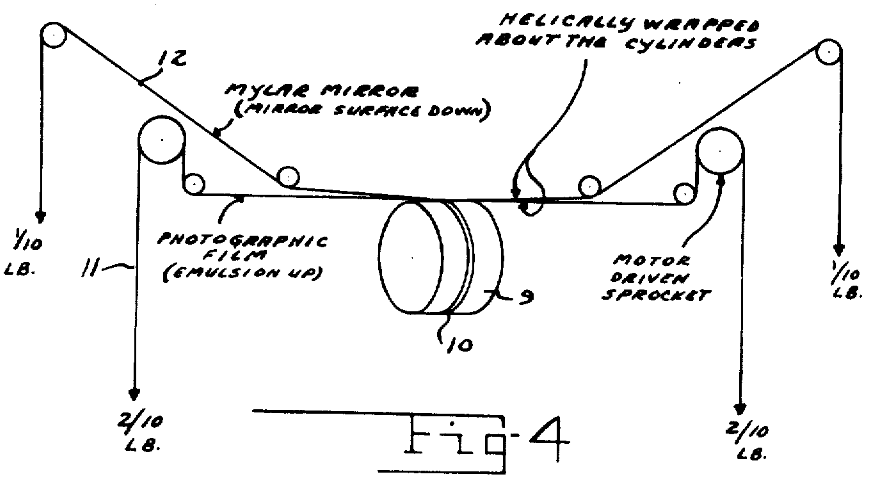
FIG. 4 is a schematic of the film and mirror tape transport system at the transmitter.
Figure 5:
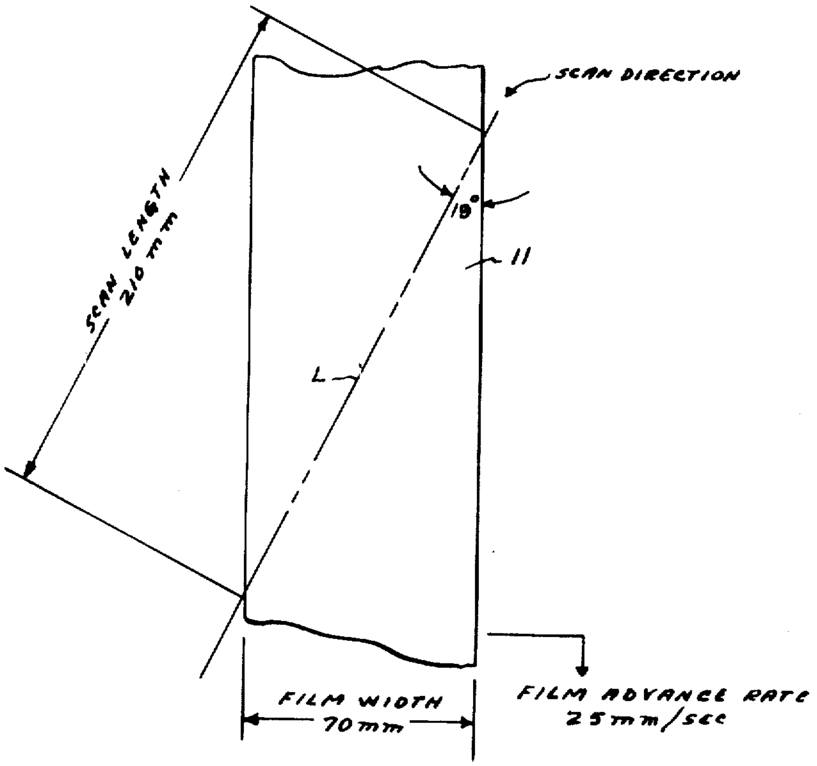
FIG. 5 is a view of a scan line appearing across the film.

The transmitter further comprises a cylindrical support drum 9 having a narrow circumferential slit 10 formed on the support drum's longitudinal midpoint. An exposed film 11 is helically wrapped around the exterior of the film support, a portion of the film always passing over the slit 10 as shown in FIG. 2. A mirror tape 12, of thin aluminized Mylar fed from a different reel system, as shown in FIG. 4, is positioned against the film 11, i.e., on the emulsion, since the film is held emulsion side out. The focusing lens 8 is positioned concentric with the axis of the cylindrical support. The optical axis of the lens 8 is deflected 90° by a scanning mirror set at angle of 45° to the axis of the lens 8 and the support 9. The center of the mirror face lies in a plane parallel to the center of said slit 10.

The lateral position of the focusing lens 8 on the film support axis is determined by the associated focal length of the lens such that the light beam received from the light unit 1 will pass through the focusing lens 8, be deflected 90° by the rotating scanning mirror 13, pass through the slit 10, and come to a focus at the exterior surface of the film 11; it of course being well known that the focal length is determined by the aperture of the objective focusing lens 8. The light is reflected back through the film 11 by the mirror tape 12, thus being twice modulated in accordance with the information stored in the film. The modulated light is directed, by the rotating scanning mirror 13, through the objective focusing lens 8 forming a collimated light beam which then passes through the quarter-wave plate 7. Since a reflected scan system is used here, the light beam passes through the quarter-wave plate twice. The quarter-wave plate converts plane-polarized light to circularly polarized light, and vice versa, and when the return beam is converted back to plane-polarized light it is in quadrature at the beam splitter 6. With this orientation, about 90 percent of the returned light is reflected at the beam splitter interface surface and deflected 90° to exit from the transmitter and accordingly, propagate through space towards the receiver.

The receiver structurally is identical to the transmitter and operates basically in the same manner as the transmitter, the exceptions being that the unexposed film 14 must be protected from premature exposure to light, from whatever source; another exception is the fact that the film 14 is not backed by any reflecting surface. The modulated light beam passes through the focusing lens 15 of the receiver 3 which converges and directs the beam to the scanning mirror 16 for deflection. The deflected beam traverses the circumferential slit 17, formed in the receiver cylindrical film support drum 18; thus scanning the portion of the helically wound film which passes over the slit. Again, the optical design parameters are such that the modulated light comes to a focus on the unexposed film, thus directly recreating the transmitted information on the film in the form of varying density.

A continuous strip of film 11 and mirror tape 12 are helically wrapped around the film support drum 9 and are constrained by their respective drive systems, as shown in FIG. 4, in a manner such that every portion of the film passes over the slit 10 at an angle of 19°. The film positioning and drive system at the receiver is generally the same as that of the transmitter, noting however, that the strip film at the receiver is not backed with a reflecting surface.

The rate at which this system can transmit and receive information is determined by the speed at which the rotating light beam scans the film strip and by the film area which is interrogated by the converging light beam, i.e., the spot size.

The effective spot size is in turn determined by the numerical aperture of the type of focusing lens used, or expressed mathematically:

$d = .665\ \lambda$ NA where $d_e$ = effective spot diameter $\lambda$ = wavelength NA = numerical aperture of the objective lens.

Figure 6:
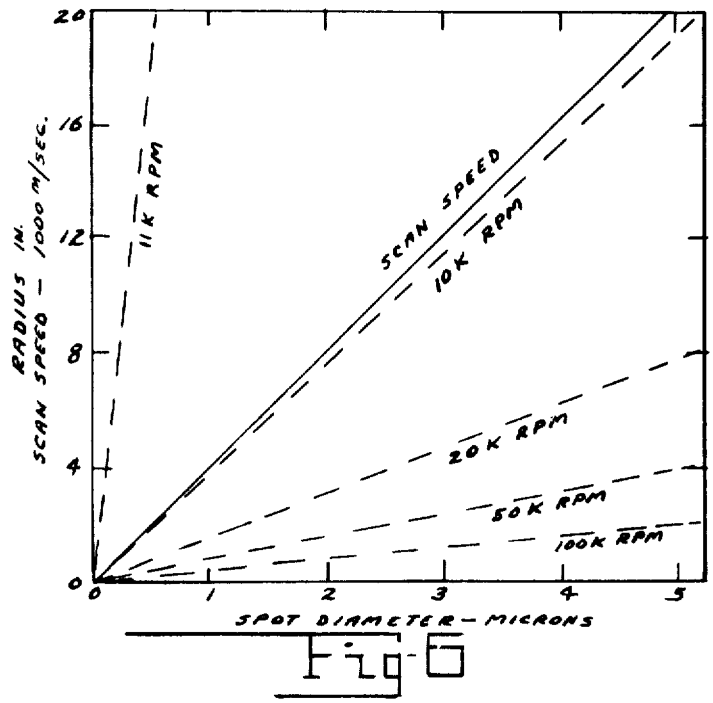
FIG. 6 is a graphic representation of the spot size vs. the scan speed and film drum radius.

Looking at FIG. 6, it can be seen that there is a direct relationship between spot size and scan rate. The scan rate in turn dictates the combination of drum radius and the speed of the motors driving the scanning mirrors The film drive is synchronized with the scanning speed in order to provide spacing between the scan lines. The correct drive speed is derived experimentally. However, a minimum satisfactory speed has been found to be 25 mm. per second. There is a requirement at the transmitter that the mirror tape 12 remain in intimate contact with the film 11 during its travel around the film support drum 9, which means that a common drive cannot be used for the film and mirror tape because the center lines of the mirror tape and film will be travelling at slightly different velocities, due to the difference in their radii of curvatures. The mirror tape is driven by the friction developed between the film and the mirror tape, thus the film and mirror tape, at their point of contact, are at a common velocity, and the remainder of the mirror support is allowed to free-wheel.

Figure 3:
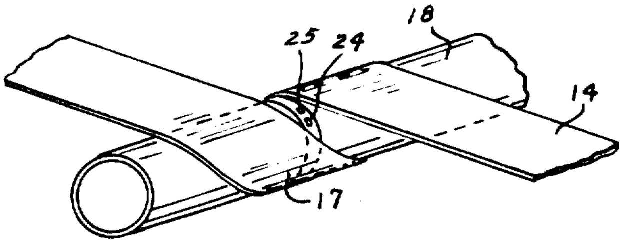
FIG. 3 is a partial isometric view of the film on the receiver film support.
Figure 7:
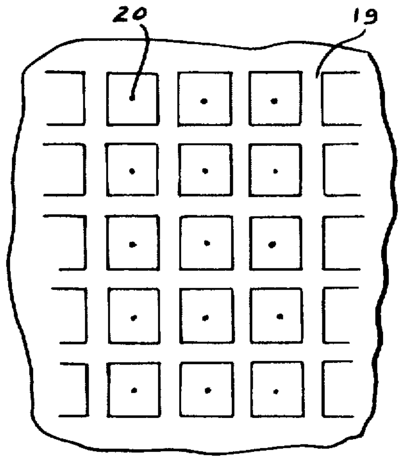
FIG. 7 is a partial top view of the film air support system.

Referring now to FIGS. 2 and 3, it is seen that the film at the transmitter and the receiver are constrained to be on the respective cylindrical support drums 9 and 18, over which the film must be free to move in a helical path. While the soft film emulsion is in the outer surface of the film, it is important to prevent scratching of the film by the stainless steel film support surfaces 9 and 18, since scratches would interfere with light transmission and reduce the resolution of the system. This is accomplished by providing a film support employing air lubrication. The film support surfaces are machined with one-eighth inch wide grooves 19, as shown in FIG. 7, both axially and circumferentially, forming a waffle grid panel of three-eighth inch square lands. Air admitted through a small hole 20 at the center of each land supports the film; this air is exhausted via the one-eighth inch grooves to the surrounding atmosphere. It has been found that a pressure of 7 p.s.i.g. is sufficient to ensure that the film does not touch the drum surface, provided the film has an applied tension of 0.2 lbs as shown in FIG. 4.

The scanning mirrors 13 and 16 are each rotated by synchronous motors 21 and 22. The motors 21 and 22 need not run in synchronism if binary information is transmitted. Such is not the case when transmitting information which requires spatial positioning, i.e., photographs. It is then necessary that the motors run in phase and in synchronism.

Synchronism is accomplished by transmitting a high intensity light beam to the receiver at the beginning of each scan line.

Referring to FIGS. 2 and 3 it can be seen that pitch of the helical turn results in a small gap being formed between the inside edges of the helically wound film at both the transmitter and receiver support drums. This gap will always retain its orientation on the support drum as the film is drawn about the drum by the film driving motor, not shown.

A portion of the film gap will always appear at the slit 10 on the transmitter. A high reflecting mirror 23 is placed at the position where the gap appears over the slit 10 with its reflecting surface in the same plane as the mylar reflecting surface 12 which results in a high intensity beam pulse reflected and transmitted to the receiver 3. Thus, a high intensity beam pulse is transmitted just prior to the beginning of a new scan line.

A gap between the film edges is also formed on the receiver film support drum 18. The portion of the gap appearing at the slit 17 corresponds to the identical position on the transmitter which is the beginning of a new scan line.

Figure 8:
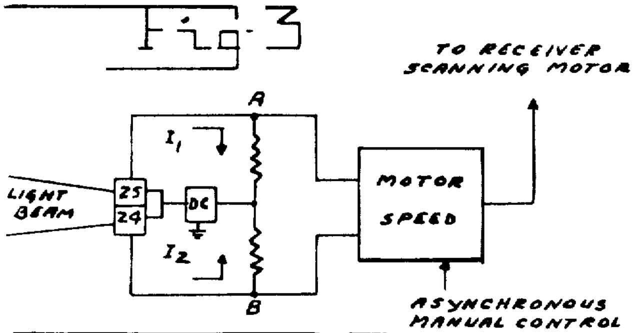
FIG. 8 is a view showing the control beam directed towards the photo devices.

The transmitted high intensity light pulse is the means for controlling the speed of the synchronous motor 22 at the receiver. This is accomplished by placing a plurality of photosensitive devices 24 and 25 at the position where the gap appears across the film drum slit 17. Looking at FIG. 8, it can be seen that if the light pulse is evenly distributed between the photodevices 24 and 25, the generated outputs will be equal, therefore A will be at the same potential as B. However, if motor 22 is running slower than motor 21, photodevice 25 will receive a greater portion of the control light pulse, thus the potential B will be greater than at A. This is sensed by a motor controller, not a subject of this invention, causing motor 22 to increase speed. The speed is decreased if the potential at A is greater than at B. In the event photodevices 24 and 25 receive no light pulse for a predetermined period of time, the motor control will sense that the receiver motor is not in phase and will automatically cause the receiver scanning motor to run at an off synchronous speed until the receiver motor is in phase with transmitter scanning motor, at which point, the motors will lock into synchronism.

The specific components used in any particular embodiment of the invention will depend on the various requirements thereof, the following specifications are given by way of example only.

| | |
|---|---|
| Light source unit 1 | He–Ne laser at 6,328A. |
| Beam Expander 5 | Spectra –Physics Model 333 with a Model 332 spatial filter. |
| Beam Splitter 7 | Bausch and Lomb No. 31-19-59-070. |
| Quarter wave plate | Vickers –Cat. No. M552085. |
| Focusing lens 8, 15 | 6X microscope objective lens Vickers, Cat. No. MO22052. |
| Scan mirror face 13, 16 | 45° ± 30° with respect to rotational axis. |
| Film drum 9 and 18 O. D. | 34 mm., stainless steel. |
| Film | 70 mm. urde. |
| Mirror tape 12 | Aluminized Mylar, 0.001-inch nominal thickness. |
| Synchronous Motors 21, 22 | Capable of 2,000 r/s. |

The above embodiment has been utilized in the transmission of $3 \times 10^7$ spots per second at a synchronous speed of 2,000 r/s.

---

We claim:

1. An optical communication transmitter for producing a collimated light beam modulated in accordance with the information contained in a strip of photographic film, said transmitter comprising: a cylindrical film support having a narrow circumferential slit about which said film, with its emulsion side outward, makes one helical turn centered on said slit and in which the pitch of said helical turn of said film is such that a small space exists between adjacent edges of the film at the start and completion of the turn; a mirror tape in contact with the emulsion side of said film; means for longitudinally moving the film and the tape together at a constant rate; means for producing a high intensity collimated incident light beam; a converging lens concentric with the axis of said cylindrical support and offset from said slit for bringing said collimated incident beam to focus on said mirror tape through said slit and said film, and for collimating the light reflected from said mirror tape; a mirror set at an angle of 45° to said axis at a point lying in the central plane of said slit and rotating about said axis at a constant speed for continuously moving said focused incident beam circumferentially of said cylindrical support along said slit at a constant speed providing a scanning beam; a reflector positioned in said space in the same plane of said mirror tape for producing a synchronizing pulse of reflected light each time said reflector is intercepted by the scanning beam; and means for separating the collimated reflected light beam from the collimated incident light beam to form the transmitted output beam.

2. An optical communication system having a transmitter as claimed in claim 1 and a receiver for recreating the transmitted information contained in the transmitter output beam on an unexposed strip of photographic film, said receiver comprising: a cylindrical film support having a narrow circumferential slit about which said film, with the emulsion side outward, makes one helical turn centered on said slit; film drive means for moving said film at a constant rate; optical means for bringing said transmitted beam to a focus on said film through said receiver slit for exposing said unexposed film to the modulated light beam; scanning means for continuously moving said focused beam circumferentially of said receiver cylindrical support along said slit; means for controlling the receiver scanning speed to be equal to that of the transmitter scanning speed.

3. Apparatus as claimed in claim 2 in which the means for controlling the receiver scanning speed includes a plurality of photo sensitive devices provided in a small space existing between adjacent edges of said helically wound film; said photo devices responsive to said transmitted synchronizing pulse and therefore generating an electrical output indicative of the receiver scanning speed with respect to the transmitter scanning speed, said generated output utilized in controlling the receiver scanning speed, in accordance with the transmitter scanning speed.